(12) United States Patent
Salah et al.

(10) Patent No.: US 10,981,812 B2
(45) Date of Patent: Apr. 20, 2021

(54) PHOTOCATALYTIC WATER TREATMENT SYSTEM

(71) Applicant: King Abdulaziz University, Jeddah (SA)

(72) Inventors: Numan Abdullah Salah, Jeddah (SA); Adnan Memic, Jeddah (SA); Mohamed Shaaban Abdel-Wahab, Jeddah (SA); Attieh Ali Al-Ghamdi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/943,711

(22) Filed: Jul. 30, 2020

(65) Prior Publication Data

US 2020/0361801 A1 Nov. 19, 2020

Related U.S. Application Data

(63) Continuation of application No. 15/636,226, filed on Jun. 28, 2017, now Pat. No. 10,752,527.

(51) Int. Cl.
| | | |
|---|---|---|
| *C02F 1/72* | (2006.01) | |
| *C02F 1/00* | (2006.01) | |

(Continued)

(52) U.S. Cl.
CPC .............. *C02F 1/725* (2013.01); *B01J 20/20* (2013.01); *B01J 20/28007* (2013.01);
(Continued)

(58) Field of Classification Search
CPC ...... B01J 35/002; B01J 20/20; B01J 27/1817; B01J 37/343; B01J 37/342; B01J 35/004;
(Continued)

(56) References Cited

U.S. PATENT DOCUMENTS

2014/0166591 A1 6/2014 Tarifi

FOREIGN PATENT DOCUMENTS

| | | |
|---|---|---|
| CN | 105126885 A | 12/2015 |
| CN | 105859024 A | 8/2016 |
| FR | 2 948 036 B1 | 1/2013 |

OTHER PUBLICATIONS

Qin, L., et al., "Synthesis and Characterization of High Efficiency and Stable Spherical Ag 3 PO 4 Visible Light Photocatalyst for the Degradation of Methylene Blue Solutions". Journal of Nanomaterials, vol. 2015, 8 Pages total, (Feb. 2015).

(Continued)

*Primary Examiner* — Cameron J Allen
(74) *Attorney, Agent, or Firm* — Oblon, McClelland, Maier & Neustadt, L.L.P.

(57) ABSTRACT

A water treatment system with a photocatalytic nanocomposite sheet, an adsorbent layer, and a fibrous filter, wherein the photocatalytic nanocomposite sheet comprises polymethylmethacrylate and silver phosphate, the adsorbent layer comprises plasma activated carbon nanotubes, and the fibrous filter is a composite of polymethylmethacrylate, polyvinylidene fluoride, and polyvinylpyrrolidone polymer fibers, with carbon nanotubes that are dispersed within the polymer fibers and silver nanoparticles that are deposited on the polymer fibers. Various embodiments of the water treatment system and methods of fabricating the photocatalytic nanocomposite sheet, the adsorbent layer, and the fibrous filter are also provided.

8 Claims, 9 Drawing Sheets

(51) Int. Cl.

| | |
|---|---|
| *B01J 20/20* | (2006.01) |
| *B01J 20/28* | (2006.01) |
| *B01J 21/18* | (2006.01) |
| *B01J 31/06* | (2006.01) |
| *B01J 37/02* | (2006.01) |
| *C02F 1/30* | (2006.01) |
| *B01J 37/34* | (2006.01) |
| *B01J 35/00* | (2006.01) |
| *B01J 27/18* | (2006.01) |
| *C02F 1/32* | (2006.01) |
| *C02F 1/28* | (2006.01) |
| *C02F 101/30* | (2006.01) |
| *C02F 103/36* | (2006.01) |
| *C02F 1/50* | (2006.01) |

(52) U.S. Cl.
CPC ......... *B01J 21/185* (2013.01); *B01J 27/1817* (2013.01); *B01J 31/06* (2013.01); *B01J 35/002* (2013.01); *B01J 35/004* (2013.01); *B01J 35/0013* (2013.01); *B01J 37/0219* (2013.01); *B01J 37/342* (2013.01); *B01J 37/343* (2013.01); *C02F 1/001* (2013.01); *C02F 1/30* (2013.01); *C02F 1/283* (2013.01); *C02F 1/32* (2013.01); *C02F 1/505* (2013.01); *C02F 2101/30* (2013.01); *C02F 2101/308* (2013.01); *C02F 2103/365* (2013.01); *C02F 2301/026* (2013.01); *C02F 2303/04* (2013.01); *C02F 2305/08* (2013.01); *C02F 2305/10* (2013.01)

(58) Field of Classification Search
CPC ................ B01J 37/0219; B01J 35/0013; B01J 20/28007; B01J 31/06; B01J 21/185; C02F 1/001; C02F 1/725; C02F 1/30; C02F 2303/04; C02F 1/505; C02F 1/283; C02F 2101/30; C02F 2305/08; C02F 2101/308; C02F 2301/026; C02F 2305/10; C02F 1/32; C02F 2103/365; C02F 1/72; C02F 1/28; C02F 1/00
See application file for complete search history.

(56) References Cited

OTHER PUBLICATIONS

Hui, X., et al., "CNT/Ag3PO4 Composites with Highly Enhanced Visible Light Photocatalytic Activity and Stability", The Chemical Engineering Journal, vol. 241, 1 Page total, (Apr. 2014) (Abstract only).

Wang, S.. et al., "In-Situ Combined Dual-Layer CNT/PVDF Membrane for Electrically-Enhanced Fouling Resistance", Journal of Membrane Science, vol. 491, pp. 37-44, (May 20, 2015).

Zhankui, C., et al., "Preparation and Characterization of Ag3PO4/BiOI Composites with Enhanced Visible Light Driven Photocatalytic Performance", Catalysis Communications, vol. 42, pp. 121-124, (Aug. 28, 2013).

Chen, G., et al., "Ag3PO4/Graphene-Oxide Composite with Remarkably Enhanced Visible-Light-Driven Photocatalytic Activity Toward Dyes in Water", Journal of Hazardous Materials, vol. 244-245. pp. 86-93, (Nov. 21, 2012).

Dong, P., et al., "Ag3PO4/Reduced Graphite Oxide Sheets Nanocomposites with Highly Enhanced Visible Light Photocatalytic Activity and Stability", Applied Catalysis B: Environmental, vol. 132-133, pp. 45-53, (Nov. 26, 2012).

Jiang, D., et al., "Highly Efficient Heterojunction Photocatalyst based on Nanoporous G-C3N4 Sheets Modified by Ag3PO4 Nanoparticles: Synthesis and Enhanced Photocatalytic Activity", Journal of Colloid and Interface Science, vol. 417, pp. 115-120, (Nov. 23, 2013).

Bai, S., et al., "Assembly of Ag3PO4 Nanocrystals on Graphene-Based Nanosheets with Enhanced Photocatalytic Performance", Journal of Colloid and Interface Science, vol. 405, pp. 1-9, (May 23, 2013).

Liu, B., et al., "Enhanced Visible-Light Photocatalytic Activities of Ag3PO4/MWCNT Nanocomposites Fabricated by Facile In Situ Precipitation Method", Journal of Alloys and Compounds, vol. 596, pp. 19-24. (Jan. 31, 2014).

Xu, L., et al., "High-Efficient Visible-Light Photocatalyst based on Graphene Incorporated Ag3PO4 Nanocomposite Applicable for the Degradation of a Wide Variety of Dyes", Journal of Photochemistry and Photobiology A: Chemistry, vol. 340, 31 Pages total, (May 1, 2017).

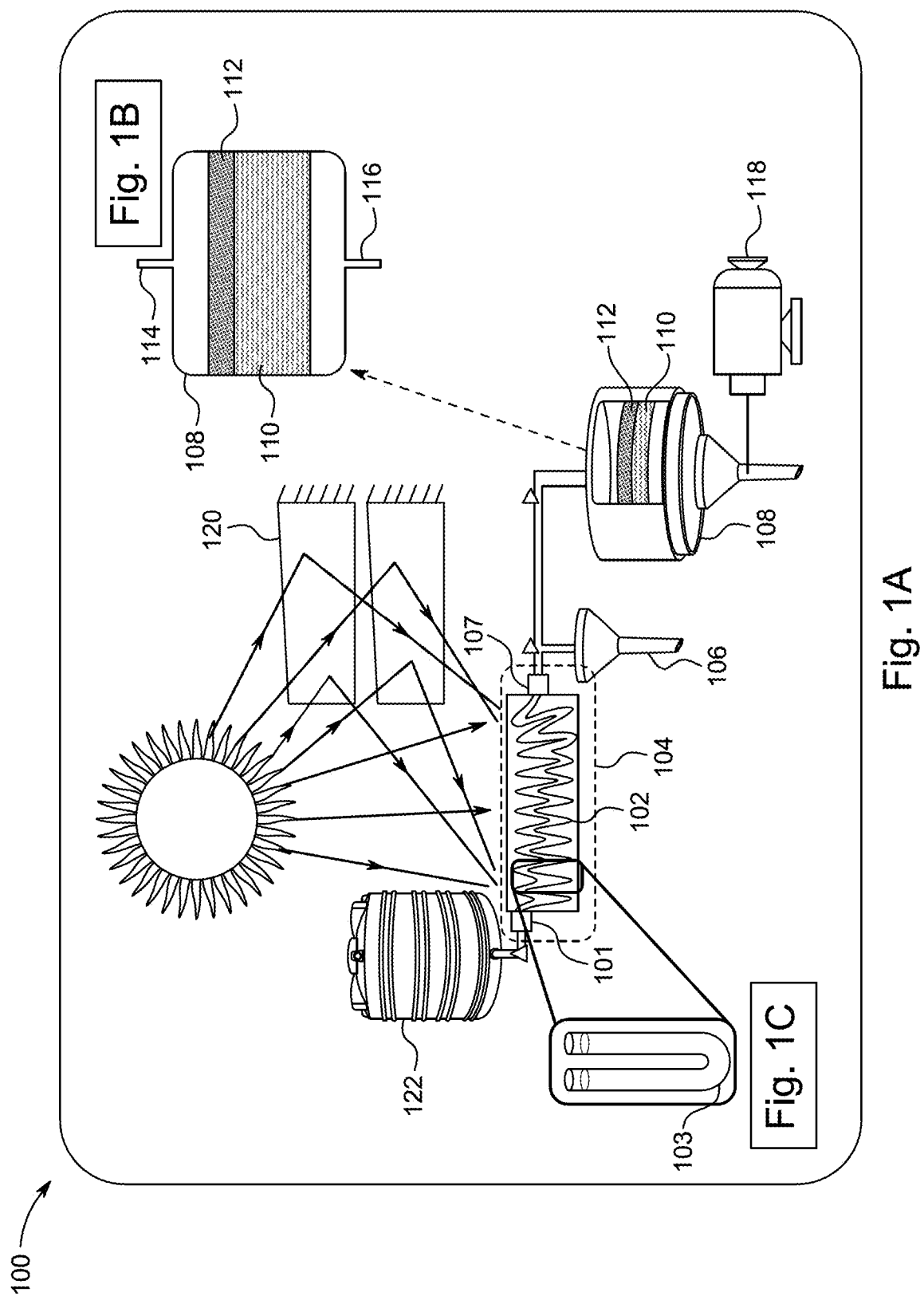

PHOTOCATALYTIC WATER TREATMENT SYSTEM

CROSS-REFERENCE TO RELATED APPLICATIONS

The present application is a Continuation of U.S. application Ser. No. 15/636,226 having a filing date of Jun. 28, 2017.

BACKGROUND OF THE INVENTION

Technical Field

The present invention relates to a water treatment system that includes a photocatalytic nanocomposite sheet, an adsorbent layer, and a fibrous filter, and methods of fabricating thereof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water pollution is a major concern for industrial areas and urban cites. Organic pollutants originated from petrochemical and manufacturing industry can cause serious environmental hazards. Various physical, chemical, and biological methods have been developed to effectively remove organic pollutants from wastewater [Numan Salah, A. Hameed, M. Aslam, M. Sh. Abdel-wahab, Saeed S. Babkair, F. S. Bahabri, Flow controlled fabrication of N doped ZnO thin films and estimation of their performance for sunlight photocatalytic decontamination of water, Chemical Engineering Journal 291 (2016)115; F. Hodin, H. Boren, A. Grimvall, Water Sci. Technol. 24 (1991) 403; N. Wang, X. Li, Y. Wang, X. Quan, G. Chen, Chemical Engineering Journal, 146, (2009) 30]. However, such materials and methods are very costly. One example is advanced oxidation processes (AOPs) for removing toxic chemical pollutants from wastewater. Among various AOPs recognized, the photocatalysis approach is a well-known approach, whereby organic pollutants are converted to $CO_2$ in the presence of a catalyst, e.g. zinc oxide (ZnO) [Numan Salah, A. Hameed, M. Aslam, M. Sh. Abdel-wahab, Saeed S. Babkair, F. S. Bahabri, Flow controlled fabrication of N doped ZnO thin films and estimation of their performance for sunlight photocatalytic decontamination of water, Chemical Engineering Journal 291 (2016)115; M. Tariq Qamar, M. Aslam, Iqbal M. I. Ismail, Numan Salah, A. Hameed, The assessment of the photocatalytic activity of magnetically retrievable ZnO coated $\gamma$-$Fe_2O_3$ in sunlight exposure, Chemical Engineering Journal, 283, (2016) 656] or titanium dioxide ($TiO_2$) [S. G. Rashid, M. A. Gondal, A. Hameed, M. Aslam, M. A. Dastageer, Z. H. Yamani, D. H. Anjum, Synthesis, characterization and visible light photocatalytic activity of $Cr^{3+}$, $Ce^{3+}$ and N co-doped $TiO_2$ for the degradation of humic acid, RSC Adv., 5, (2015) 32323]. However, producing these catalysts in large quantities is very costly. On the other hand, the time needed for pollutant degradation is relatively long. Therefore, it is important to find a high performance and inexpensive materials for a fast degradation of organic pollutants.

Extensive research work has recently been conducted on the design of a visible-light photocatalytic material for degradation of organic pollutants. Silver phosphate ($Ag_3PO_4$) has been considered as a visible-light photocatalyst and as a replacement for other known photocatalyst materials such as $TiO_2$ and ZnO. Silver phosphate revealed a quantum efficiency of up to 90% at wavelengths above 420 nm. Silver phosphate was also found to be a strong photooxidant. [Chao Dong, Kong-LinWu, Meng-Ran Li, Li Liu, Xian-Wen Wei, Synthesis of $Ag_3PO_4$—ZnO nanorod composites with high visible-light photocatalytic activity, Catalysis Communications 46, (2014) 32; Yingpu Bi, Hongyan Hu, Shuxin Ouyang, Gongxuan Lu, Junyu Cao and Jinhua Ye, Photocatalytic and photoelectric properties of cubic $Ag_3PO_4$ sub-microcrystals with sharp corners and edges, hem. Commun., 48, (2012) 3748; I. S. Yahia, Asim Jilani, Mohamed S. Hamdy, M. Sh. Abdel-wahab, H. Y. Zahran, M. Shahnawaze Ansari, Attieh A. Al-Ghamdi, The photocatalytic activity of graphene oxide/$Ag_3PO_4$ nanocomposite: Loading effect, Optik, 127, (2016) 10746; Zheng-Mei Yang, Gui-Fang Huang, Wei-Qing Huang, Jia-Mou Wei, Xin-Guo Yan, Yue-Yang Liu, Chao Jiao, Zhuo Wan and Anlian Pan, Novel $Ag_3PO_4$/$CeO_2$ composite with high efficiency and stability for photocatalytic applications, J. Mater. Chem. A, 2, (2014) 1750]. A number of research articles reported that $Ag_3PO_4$ has a high photocatalytic efficiency due to the high rate of electron/hole separation [Yunfang Wang, Xiuli Li, Yawen Wang, Caimei Fan, Novel visible-light AgBr/$Ag_3PO_4$ hybrids photocatalysts with surface plasma resonance effects, Journal of Solid State Chemistry, 202, (2013) 51]. However, using catalysts in a powder form is challenging, due to agglomeration of catalyst particles and the difficulty of removing the catalyst particles after a treatment process.

Electrospun polyvinylidene fluoride (PVDF) nanofibers are widely used in water filtration systems because of a good oxidation stability, a good thermal stability, and a good hydrolytic stability of the PVDF nanofibers. However, the relatively low mechanical stability and non-uniform pores distribution of the PVDF nanofibers largely restrict the applications of nanofibers [Z. Ma, M. Kotaki, S. Ramakrishna, Electrospun cellulose nanofiber as affinity membrane, J. Membr. Sci., 265, (2005) 115]. To overcome this drawback, several research studies have investigated the stability of the PVDF nanofiber after incorporating nanomaterials such as $TiO_2$ [J. H. Li, Y. Y. Xu, L. P. Zhu, J. H. Wang, C. H. Du, Fabrication and characterization of novel $TiO_2$ nanoparticle self-assembly membrane with improved fouling resistance, J. Membr. Sci., 326, (2009) 659], $Al_2O_3$ [Y. Lu, S. L. Yu, B. X. Chai, Preparation of poly (vinylidene fluoride) ultrafiltration membrane modified by nano-sized alumina ($Al_2O_3$) and its antifouling research, Polymer, 46, (2005) 7701], silver nanoparticles [L. Francis, F. Giunco, A. Balakrishnan, E. Marsano, Synthesis, characterization and mechanical properties of nylon-silver composite nanofibers prepared by electrospinning, Curr. Appl. Phys., 10, (2010) 1005], and carbon nanotubes [S. Aryal, C. K. Kim, K. W. Kim, M. S. Khil, H. Y. Kim, Multi-walled carbon nanotubes/$TiO_2$ composite nanofiber by electrospinning, Mater. Sci. Eng. C, 28, (2008) 75]. It was shown that incorporating the aforementioned nanomaterials in the PVDF nanofibers enhanced the mechanical properties, thermal and chemical stability, separation performance, etc. of the PVDF nanofibers.

Several reports focused on designing and developing variety of composite materials for water treatments. For example, Berge et al. [J. Berge, J Boutillier, P. Delprat., Patent no. FR2948036B1], reported on the use of a transparent composition based on methacrylic polymers for the construction of a photo-reactor in the field of treatment of drinking water, waste water pollution control, treatment of air or gas, deodorizing or decontamination of soil. Cheng et al. [S. Cheng, X. Li., $Ag_3PO_4$ photo-catalysis coupling constructed wetland microorganism fuel battery system and its application, Patent no. CN105859024A] reported a cathode conductive material layer filled with a conductive carbon material and a photocatalyst $Ag_3PO_4$ for fuel battery system. Tarifi et al. [Mohamed H. Tarifi. Pco/uvc/carbon water filter, US patent application no. US20140166591A1] developed a water treatment system that contains activated carbon and titanium dioxide as a photocatalytic filter with the use of ultraviolet lamp. Chen et al. [G. Chen, M. Sun, Q. Wei, Y. Zhang, B. Zhu, B Du, $Ag_3PO_4$/graphene-oxide composite with remarkably enhanced visible-light-driven photocatalytic activity toward dyes in water, Journal of Hazardous Materials, 244-245, (2013) 86-93] produced $Ag_3PO_4$/graphene-oxide composite for the removal of dyes in water. Similarly Dong et al. [P. Dong, Y. Wang, B. Cao, S. Xin, L. Guo, J. Zhang, F. Li, $Ag_3PO_4$/reduced graphite oxide sheets nanocomposites with highly enhanced visible light photocatalytic activity and stability, Applied Catalysis B: Environmental, 132-133, (2013) 45-53] synthesized $Ag_3PO_4$/reduced graphite oxide nanocomposites and Bai et al. [S. Bai, X. Shen, H. Lv, G. Zhu, C. Bao, Y. Shan, Assembly of $Ag_3PO_4$ nanocrystals on graphene-based nanosheets with enhanced photocatalytic performance, Journal of Colloid and Interface Science, 405, (2013) 1-9] produced $Ag_3PO_4$/Graphene nanocomposites. Xu et al. [L. Xu, Y. Wang, J. Liu, S. Han, Z. Pan, Lu Gan, High-efficient visible-light photocatalyst based on grapheme incorporated $Ag_3PO_4$ nanocomposite applicable for the degradation of a wide variety of dyes, Journal of Photochemistry and Photobiology A: Chemistry, Accepted Manuscript 2017, DOI: http://dx.doi.org/doi:10.1016/j.jphotochem.2017.02.022] synthesized a nanocomposite of $Ag_3PO_4$ and graphene in a powder form for the degradation of a wide variety of dyes. Jiang et al. [D. Jiang, J. Zhu, M. Chen, J. Xie, Highly efficient heterojunction photocatalyst based on nanoporous g-$C_3N_4$ sheets modified by $Ag_3PO_4$ nanoparticles: Synthesis and enhanced photocatalytic activity, Journal of Colloid and Interface Science, 417, (2014) 115-120] fabricated a heterojunction photocatalyst based on nanoporous g-$C_3N_4$ sheets modified by $Ag_3PO_4$ nanoparticles. Qin et al. [L. Qin, P. Tao, X. Zhou, X. Luo, Synthesis and characterization of high efficiency and stable spherical $Ag_3PO_4$ visible light photocatalyst for the degradation of methylene blue solutions, Journal of Nanomaterials, (2015) Article ID 258342] synthesized spherical $Ag_3PO_4$ for the degradation of methylene blue solutions. Hui et al. [X. Hui, C. Wang, Y. Song, H. Li, CNT/$Ag_3PO_4$ composites with highly enhanced visible light photocatalytic activity and stability, Chemical Engineering Journal, 241, (2014) 35-42] reported the synthesis of a heterojunction structure of CNT/$Ag_3PO_4$ composite. Similarly, Liu et al. [B. Liu, Z. Li, S. Xu, D. Han, D. Lu, Enhanced visible-light photocatalytic activities of $Ag_3PO_4$/MWCNT nanocomposites fabricated by facile in situ precipitation method, Journal of Alloys and Compounds, 596, (2014) 19-24] produced $Ag_3PO_4$/MWCNT powder nanocomposites by a facile in-situ precipitation method. Wang et al. [S. Wang, S. Liang, P. Liang, X. Zhang, J. Sun, S. Wu, X. Huang, In-situ combined dual-layer CNT/PVDF membrane for electrically-enhanced fouling resistance, Membrane Science, 491, (2015) 37-44] fabricated a CNT/PVDF membrane for electrically-enhanced fouling resistance.

In view of the forgoing, one objective of the present invention is to provide a water treatment system that includes a photocatalytic nanocomposite sheet. The sheet is a composite of polymethylmethacrylate and silver phosphate, which is located inside a transparent section of a pipe or vessel in the water treatment system. The water treatment system further includes an adsorbent layer of plasma activated carbon nanotubes, and a fibrous filter that is a composite of polymethylmethacrylate, polyvinylidene fluoride, and polyvinylpyrrolidone polymer fibers, with carbon nanotubes that are dispersed within the polymer fibers and silver nanoparticles that are deposited on the polymer fibers. Another objective of the present invention relates to methods of fabricating the photocatalytic nanocomposite sheet, the adsorbent layer, and the fibrous filter.

BRIEF SUMMARY OF THE INVENTION

According to a first aspect, the present disclosure relates to a water treatment system, including i) a pipe comprising a water inlet, a water outlet, and a transparent section located between the water inlet and the water outlet, ii) a photocatalytic nanocomposite sheet comprising polymethylmethacrylate and silver phosphate located inside the transparent section, wherein the photocatalytic nanocomposite sheet is configured to decompose at least a portion of organic pollutants present in water.

In one embodiment, the transparent section is coil shaped.

In one embodiment, the photocatalytic nanocomposite sheet has a thickness in the range of 0.5 to 2 mm.

In one embodiment, the water treatment system further includes at least one mirror configured to reflect sunlight to the transparent section.

In one embodiment, the water treatment system further includes i) a filter housing with an inlet and an outlet, ii) a fibrous filter located inside the filter housing and between the inlet and the outlet, wherein the inlet is fluidly connected to the water outlet.

In one embodiment, the fibrous filter includes polymer fibers comprising polymethylmethacrylate, polyvinylidene fluoride, and polyvinylpyrrolidone, and silver nanoparticles deposited on the polymer fibers.

In one embodiment, the fibrous filter has pores with an average pore size in the range of 5 to 50 nm.

In one embodiment, the fibrous filter further includes carbon nanotubes that are dispersed in the polymer fibers.

In one embodiment, the water treatment system further comprises an adsorbent layer of plasma activated carbon nanotubes located within the filter housing between the fibrous filter and the inlet.

According to a second aspect, the present disclosure relates to a method of purifying water with the water treatment system, involving passing the water through the photocatalytic nanocomposite sheet to form purified water.

In one embodiment, the water treatment system further includes the filter housing and the fibrous filter, and the method involves passing the water through the photocatalytic nanocomposite sheet and the fibrous filter to form purified water.

In one embodiment, a ratio of a total organic carbon content of the water to a total organic carbon content of the purified water is in the range of 2:1 to 5:1.

According to a third aspect, the present disclosure relates to a method of fabricating the photocatalytic nanocomposite sheet, involving i) mixing silver phosphate nanoparticles with a polymer solution comprising polymethylmethacrylate in an organic solvent to form a suspension, ii) sonicating the suspension, iii) casting the suspension on a substrate to evaporate the organic solvent and form the photocatalytic nanocomposite sheet.

In one embodiment, the organic solvent is chloroform, and the polymer solution is formed by dissolving polymethylmethacrylate in chloroform at a temperature of 35 to 55° C.

According to a fourth aspect, the present disclosure relates to a method of fabricating the fibrous filter, involving i) mixing a colloidal suspension comprising silver nanoparticles, polyvinylpyrrolidone, and dimethylformamide with a ketone-based solvent to form a precursor suspension, ii) mixing polyvinylidene fluoride with the precursor suspension to form a first suspension, iii) separately mixing polymethylmethacrylate with the precursor suspension to form a second suspension, iv) mixing the first suspension with the second suspension to form an electrospin suspension, v) electrospinning the electrospin suspension to form the fibrous filter, wherein the fibrous filter comprises polymer fibers comprising polymethylmethacrylate, polyvinylidene fluoride, and polyvinylpyrrolidone, and silver nanoparticles deposited on the polymer fibers.

In one embodiment, the ketone-based solvent is acetone, and the colloidal suspension is mixed with acetone at a volume ratio of 3:1 to 5:1.

In one embodiment, a weight percent of polyvinylidene fluoride in the first suspension is 10 to 20 wt % relative to the total weight of the first suspension, and a weight percent of polymethylmethacrylate in the second suspension is 10 to 20 wt % relative to the total weight of the second suspension.

In one embodiment, the first suspension is mixed with the second suspension at a volume ratio of 2:1 to 4:1.

In one embodiment, the method further includes mixing a carbon nanotube suspension comprising carbon nanotubes and dimethylformamide with the electrospin suspension and sonicating prior to the electrospinning.

In one embodiment, the carbon nanotube suspension has a carbon nanotube concentration of 0.5 to 2 g/L, and the carbon nanotube suspension is mixed with the electrospin suspension at a volume ratio of 1:6 to 1:10.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A shows the water purification system of this disclosure that includes a photocatalytic nanocomposite sheet, an adsorbent layer, and a fibrous filter.

FIG. 1B shows the adsorbent layer and the fibrous filter in the filter housing.

FIG. 1C shows the photocatalytic nanocomposite sheet that is placed in a U-shape glass tube.

FIG. 2B is a magnified optical image of the photocatalytic nanocomposite sheet. Silver phosphate particles are observed in the form of nanocrystals.

DETAILED DESCRIPTION OF THE EMBODIMENTS

Figure 1D:
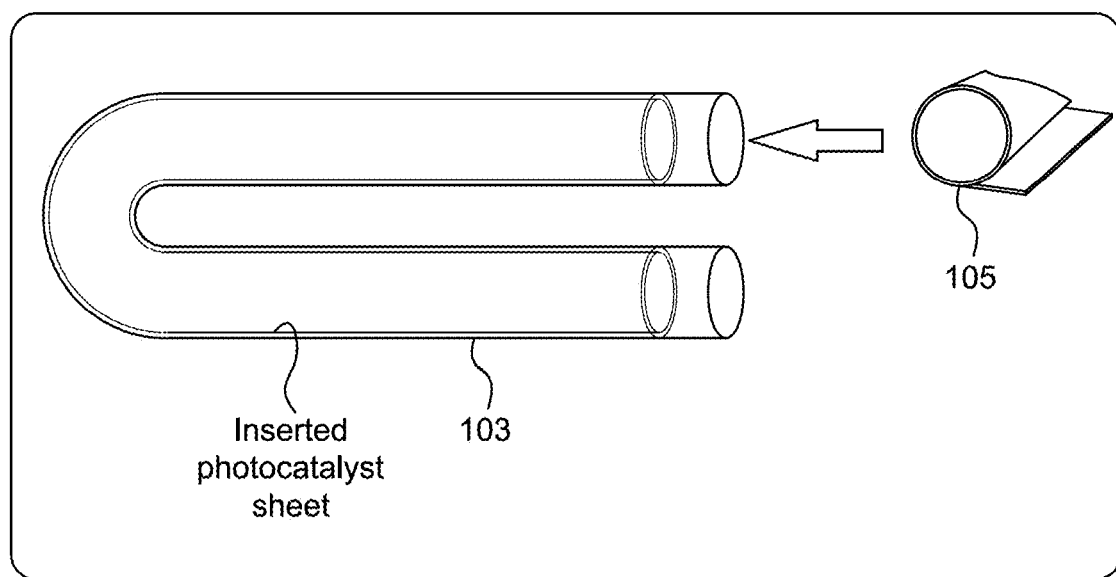
FIG. 1D shows the photocatalytic nanocomposite sheet that is inserted in a U-shape glass tube.

Referring now to the drawings, wherein like reference numerals designate identical or corresponding parts throughout the several views.

According to a first aspect, the present disclosure relates to a water treatment system 100, including a pipe 104 that has a water inlet 101, a water outlet 107, and a transparent section 102 located between the water inlet 101 and the water outlet 107.

The term "pipe" refers to a means for carrying a fluid or a liquid stream, e.g. a water stream. The pipe 104 may have a circular, rectangular, triangular, elliptical, or rectilinear cross-section. Preferably, the pipe has a circular cross-section with a diameter in the range of to 100 mm, preferably 20 to 90 mm, preferably 30 to 80 mm, preferably 40 to 60 mm, preferably about 50 mm. The pipe may have a uniform cross-section, wherein a cross-sectional area is substantially the same along the length of the pipe, or may have a non-uniform cross-section, wherein a cross-sectional area is not the same along the length of the pipe. However, a cross-sectional area of the pipe along the transparent section is preferably substantially the same.

The length of the pipe 104 may vary from about 0.5 m to about 50 m, preferably from about 1.0 m to about 30 m, preferably from about 2 m to about 20 m, preferably from about 3 m to about 20 m, preferably from about 4 m to about 15 m, preferably from about 5 m to about 10 m. Accordingly, the length of the transparent section may preferably be at least 50%, preferably at least 60%, preferably at least 70%, preferably at least 80%, preferably at least 90% of the total length of the pipe. Accordingly, in one embodiment, the transparent section 102 has a total volume capacity in the range of 1 to 50 L, preferably 2 to 45 L, preferably 5 to 40 L, preferably 10 to 35 L, preferably 15 to 30 L, preferably about 20 L.

The term "transparent section" of the pipe refers to a section of the pipe that is transparent and thus allows sunlight, more particularly transparent to infrared, visible light, and/or ultra violet radiation, to pass through. In a preferred embodiment, the transparent section 102 is in the form of a coil (as shown in FIG. 1A) to provide an extended surface area to solar radiation. In one embodiment, the transparent section 102 is made of a plurality of U-shape tubes 103 (as shown in FIGS. 1C and 1D) that are coupled together to form the coil. Accordingly, the transparent section may be made of at least 3, preferably at least 5, preferably at least 10, preferably at least 15, preferably at least 20, preferably at least 25, preferably at least 30, preferably at least 35, preferably at least 40, but no more than 100 of the U-shape tubes 103 that are coupled together. In one embodiment, an external surface area of the transparent section is sufficient to receive a light illuminance of at least 100,000 lux, preferably at least 110,000 lux, more preferably at least 120,000 lux, but no more than 200,000 lux.

In one embodiment, the transparent section is made of a transparent material. Exemplary transparent materials include, but are not limited to glass, general purpose polystyrene (GPPS), polycarbonate (PC), poly methylmethacrylate (PMMA), styrene acrylonitrile (SAN), styrene methyl methacrylate (SMMA), polyethylene terephthalate glycol-modified (PET-G), methyl methacrylate butadiene styrene (MBS), and/or any combination thereof. In a preferred embodiment, the transparent section is made of quartz.

In another preferred embodiment, the water treatment system 100 further includes one or more mirrors 120 located in the vicinity of the transparent section 102 of the pipe 104. Said mirrors are configured to reflect sunlight to the transparent section (as shown in FIG. 1A).

The term "in the vicinity of the transparent section" as used herein refers to a location within a distance no more than 100 cm, preferably no more than 90 cm, preferably no more than 80 cm, preferably no more than 70 cm, preferably no more than 60 cm, preferably no more than 50 cm, from the transparent section.

In one embodiment, said mirrors 120 are located underneath and parallel to the transparent section, wherein a gap of about 10 to 50 cm, preferably 20 to 40 cm is present between said mirrors and the transparent section. Preferably, the mirror is located underneath the entire length of the transparent section.

In a preferred embodiment, said mirrors 120 are concave mirrors to focus solar radiation to a focal point. Accordingly, the transparent section is located with respect to the focal point such that the transparent section falls at the focal point.

The water treatment system 100 may optionally include a pump or suction source 118 to flow a water stream within the pipe, or to adjust the flow rate of the water stream within the pipe. The pump 118 may be a centrifugal, a rotatory, or a positive displacement pump; although the type of pump used is not meant to be limiting and other types of pumps may also be used. In addition to the pump, a flow-rate control system may also be utilized to regulate the flow rate of the water stream through the pipe and, particularly through the transparent section of the pipe. The flow-rate control system may include a flow meter to determine a flow rate within the pipe and/or within the transparent section, a processing unit in communication with the flow meter to receive an input signal and transmit an output signal to an actuator to operate a valve to adjust the flow rate of the water stream within the pipe and/or within the transparent section. In another embodiment, a detector is utilized to instantaneously measure a total organic carbon content of a water stream that outflows the transparent section. Accordingly, the detector is in communication with the processing unit and the actuator via a feedback control system. Said control system is configured to adjust the flow rate of the water stream within the pipe and/or within the transparent section, based on variations of the total organic carbon content in the water stream.

The water treatment system 100 further includes a photocatalytic nanocomposite sheet 105 that is located inside the transparent section 102 of the pipe 104.

The term "photocatalytic nanocomposite sheet" as used in this disclosure refers to a composite of polymethylmethacrylate (PMMA) and silver phosphate ($Ag_3PO_4$) nanoparticles that is in a form of a sheet with a thickness in the range of 0.5 to 2 mm, preferably 0.6 to 1.8 mm, preferably 0.7 to 1.5 mm, preferably 0.8 to 1.2 mm, more preferably about 1 mm. Said photocatalytic nanocomposite sheet is configured to decompose at least a portion of organic pollutants present in water, when exposed to direct sunlight. In a preferred embodiment, a weight ratio of silver phosphate ($Ag_3PO_4$) to polymethylmethacrylate (PMMA) ranges between 1:15 to 1:40, preferably 1:18 to 1:30, more preferably about 1:20. In another embodiment, a weight percent of silver phosphate ($Ag_3PO_4$) in the photocatalytic nanocomposite sheet is in the range of 2 to 8 wt %, preferably 3 to 6 wt %, preferably about 4.5 wt %, relative to the total weight of the photocatalytic nanocomposite sheet. Accordingly, a weight percent of polymethylmethacrylate (PMMA) in the photocatalytic nanocomposite sheet is in the range of 90 to 98 wt %, preferably 93 to 97 wt %, preferably about 95 wt %, relative to the total weight of the photocatalytic nanocomposite sheet. In addition, the photocatalytic nanocomposite sheet may have a specific surface area in the range of 5 to 50 $m^2/g$, preferably 10 to 40 $m^2/g$, preferably 12 to 30 $m^2/g$, preferably 15 to 20 $m^2/g$.

Figure 2A:
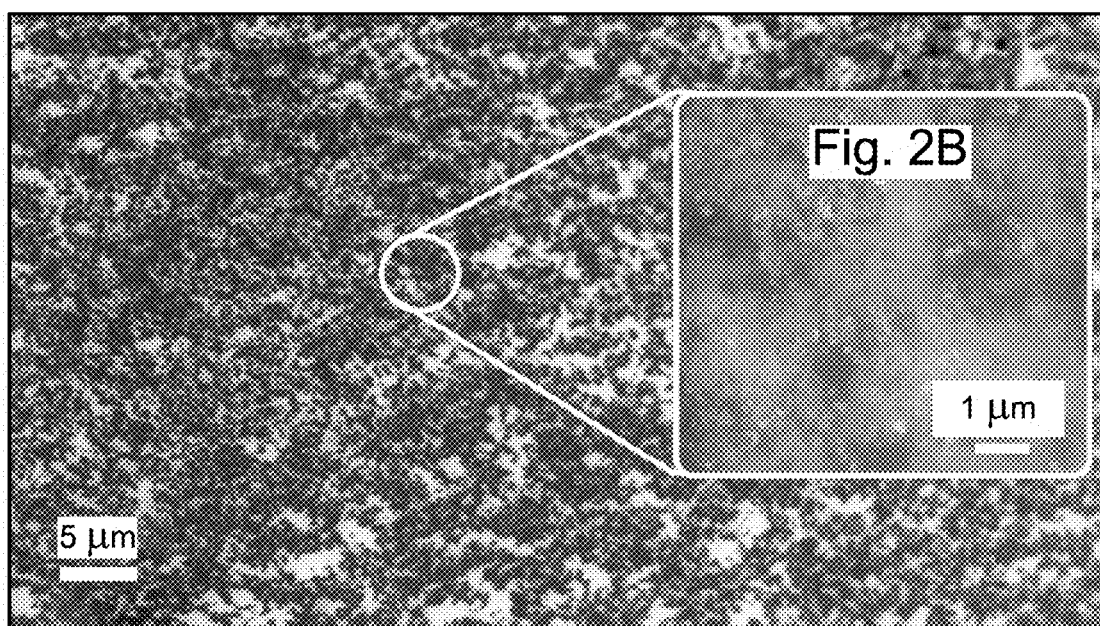
FIG. 2A is an optical image of the photocatalytic nanocomposite sheet.

Accordingly, the transparent section of the water treatment system is placed in an uncovered location under solar radiation, wherein a light illuminance received by the photocatalytic nanocomposite sheet in the transparent section is in the range of 5,000 to 120,000 lux, preferably 10,000 to 110,000 lux, more preferably 30,000 to 100,000 lux, even more preferably 50,000 to 80,000 lux. In another embodiment, a light irradiance received by the photocatalytic nanocomposite sheet in the transparent section may preferably be in the range of 200-1,200 $W/m^2$, preferably 250-1,000 $W/m^2$, more preferably 300-850 $W/m^2$. An optical micrograph of the photocatalytic nanocomposite sheet 105 is shown in FIGS. 2A and 2B.

In the absence of solar radiation, for example, in a cloudy day or at nights, the transparent section of the water treatment system may be exposed to an artificial light source, wherein a light irradiance received by the photocatalytic nanocomposite sheet in the transparent section may be in the range of 100-1,000 $W/m^2$, preferably 150-800 $W/m^2$, more preferably 200-500 $W/m^2$. Exemplary artificial light sources include, but are not limited to a microwave, a UV light, a visible light bulb, a fluorescent bulb/tube, an X-ray source, a γ-ray source, and an infrared source.

One aspect of the invention relates to a method of fabricating the photocatalytic nanocomposite sheet 105. The method involves mixing silver phosphate nanoparticles with a polymer solution to form a suspension. The silver phosphate nanoparticles may have an average size in the range of 10 to 80 nm, preferably about 20 to 70 nm, preferably about 30 to 60 nm, preferably about 40 to 50 nm.

In one embodiment, the polymer solution includes polymethylmethacrylate dissolved in an organic solvent. A concentration of polymethylmethacrylate in the polymer solution is preferably in the range of 10 to 30 g/L, preferably 15 to 25 g/L, preferably about 20 g/L. For example, in one embodiment, 1 to 3 g, preferably 1.5 to 2.5 g, preferably about 2 g of PMMA is dissolved in 100 mL of an organic solvent. In addition a weight ratio of the silver phosphate nanoparticles to that of PMMA in the suspension is in the range of 1:10 to 1:30, preferably 1:15 to 1:25, preferably about 1:20. For example, in one embodiment, the suspension includes about 80 to 120 mg, preferably about 100 mg of the silver phosphate nanoparticles, and about 1.8 to 2.2 g, preferably about 2 g of PMMA in about 80 to 120 mL, preferably about 100 mL of an organic solvent.

The organic solvent may be one or more solvent selected from the group consisting of methanol, toluene, tetrahydrofuran, acetic acid, acetone, acetonitrile, butanol, dichloromethane, chlorobenzene, dichloroethane, diethylene glycol, diethyl ether, dimethoxy-ethane, dimethyl-formamide, dimethyl sulfoxide, ethanol, ethyl acetate, ethylene glycol, heptane, methyl t-butyl ether, methylene chloride, pentane, cyclopentane, hexane, cyclohexane, benzene, dioxane, propanol, isopropyl alcohol, pyridine, triethyl amine, propandiol-1,2-carbonate, ethylene carbonate, propylene carbonate, nitrobenzene, formamide, benzyl alcohol, n-methyl-2-pyrrolidone, acetophenone, benzonitrile, dimethyl sulfate, aniline, phenol, dichlorobenzene, tri-n-butyl phosphate, ethylene sulfate, benzenethiol, dimethyl acetamide, cyclohexanol, bromobenzene, cyclohexanone, 1-hexanethiol, ethyl chloroacetate, 1-dodecanthiol, di-n-butylether, dibutyl ether, acetic anhydride, m-xylene, o-xylene, and p-xylene. Depending on the type of solvent used, the polymer solution is formed by dissolving polymethylmethacrylate in the organic solvent at a temperature that is at least 10° C., preferably 15 to 20° C. above room temperature (i.e. 25° C.) and 5 to 15° C., preferably about 10° C. below the boiling point of the organic solvent. For example, in a preferred embodiment, the organic solvent is chloroform, and the polymer solution is formed by dissolving polymethylmethacrylate in chloroform at a temperature of 35 to 60° C., preferably to 55° C., more preferably about 50° C.

After mixing the silver phosphate nanoparticles with the polymer solution, the suspension is sonicated at room temperature (i.e. 25° C.), and preferably stirred concurrently during sonication until a yellow suspension is obtained.

After sonicating the suspension, the suspension is casted on a substrate, e.g. a petri dish, to evaporate at least a portion of the organic solvent and form the photocatalytic nanocomposite sheet. Preferably the suspension is kept for a sufficient time, e.g. 24 hours, preferably 48 hours, on the substrate in an elevated temperature, 35 to 60° C., preferably 45 to 55° C., more preferably about 50° C., to entirely evaporate the organic solvent. The substrate may be a glass substrate, preferably a flexible rubber substrate, e.g. silicon rubber, that allows an easy removing of the photocatalytic nanocomposite sheet from the substrate.

Preferably, the photocatalytic nanocomposite sheet 105 is secured inside the transparent section 102 of the pipe 104 such that the photocatalytic nanocomposite sheet 105 covers at least a portion of an internal surface area of the transparent section of the pipe 104 (as shown in FIGS. 1C and 1D). Placing the photocatalytic nanocomposite sheet inside the transparent section of the pipe can be done by, for example, rolling the photocatalytic nanocomposite sheet to form a tube shape, and inserting said tube-shaped photocatalytic sheet into individual U-shape tubes that are separated from each other, and further coupling said U-shape tubes to form the transparent section.

The photocatalytic nanocomposite sheet 105 is configured to decompose at least a portion of organic pollutants present in water in the presence of sunlight.

In a preferred embodiment, the water treatment system 100 further includes a filter housing 108 and a fibrous filter 110 located therein. The term "filter housing" as used herein refers to a container with an inlet 114 and an outlet 116, and an internal cavity that is configured to hold a liquid preferably at elevated pressures, for example, a pressure in the range of 0.5-10 bars, preferably 1-5 bars. The filter housing 108 may be made of alumina, quartz, stainless steel, nickel steel, chromium steel, aluminum, aluminum alloy, copper and copper alloys, titanium, and the like, although the materials used to construct the filter housing are not meant to be limiting and various other materials may also be used. In one embodiment, a portion of an internal surface of the filter housing is coated with a polymeric lining to minimize surface oxidation. The polymeric lining may be an epoxy or a vinyl ester, preferably a BPA-free polymer such as polyethylene, polypropylene, or polytetrafluoroethylene. In one embodiment, the filter housing has an internal volume in the range of 0.1-1,000 L, preferably 5-500 L, or preferably 10-150 L, or preferably 50-100 L. Geometry of the filter housing may be one of cylindrical, cubic, rectangular, spherical, oblong, conical, or pyramidal. Preferably, the filter housing is cylindrical and is vertically oriented (as shown in FIGS. 1A and 1B). The filter housing may also be a cylindrical container that is horizontally oriented. In another preferred embodiment, the filter housing is portable having an internal volume in the range of 0.5-10.0 L, preferably 1-8.0 L, more preferably 2-5.0 L.

The inlet 114 and the outlet 116 are utilized as passages for loading and unloading the filter housing 108 with water. In one embodiment, the inlet 114 and the outlet 116 are substantially the same, wherein each is a cylindrical port having an internal diameter in the range of 1-20 mm, preferably 5-10 mm. The inlet 114 and the outlet 116 are configured to pass water with a flow rate of up to 500 L/min, preferably up to 1,000 L/min. The inlet 114 and the outlet 116 may be secured with threaded fittings, or other means, to the filter housing 108.

In one embodiment, the filter housing is a vertically oriented cylinder that includes a liquid distributor located inside the filter housing and attached to the inlet 114. The liquid distributor is configured to divide an inlet stream that enters the filter housing into a plurality of streams and distributes said streams throughout a cross-section of the filter housing. The liquid distributor may be made of glass or metal, and can be used in any shape, preferably disc shape, cylindrical, or spherical. For example, in one embodiment, the liquid distributor has a perforated disc-shape structure. Size of perforations in the liquid distributor may be different ranging from 0.5-2 mm, preferably about 1 mm.

Preferably, the inlet 114 and the outlet 116 are located on opposite ends (as shown in FIG. 1), although in some embodiments, the inlet and the outlet may be located on the same end.

In one embodiment, the inlet 114 and the outlet 116 are located on opposite ends, and the fibrous filter 110 is located inside the filter housing and between the inlet and the outlet. The inlet 114 of the filter housing is fluidly connected to the water outlet 107 of the pipe.

In some embodiments, the fibrous filter 110 includes polymer fibers of polymethylmethacrylate (PMMA), polyvinylidene fluoride (PVDF), and polyvinylpyrrolidone (PVP). In addition, silver nanoparticles are deposited on the polymer fibers. In one embodiment, a weight percent of silver nanoparticles that are deposited on the polymer fibers is in the range of 0.5 to 5 wt %, preferably 1 to 3 wt %, more preferably about 1 to 1.5 wt %, relative to the total weight of the fibrous filter. Additionally, a weight ratio of polymethylmethacrylate (PMMA) to polyvinylidene fluoride (PVDF) may be in the range of 1:1 to 1:2, preferably about 1:1, whereas a weight ratio of polymethylmethacrylate (PMMA) to polyvinylpyrrolidone (PVP) may be in the range of 1:1 to 1:2, preferably about 1:1.5.

Figure 4:
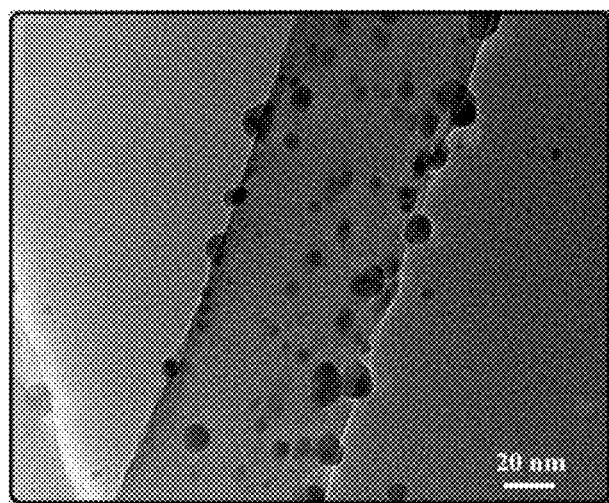
FIG. 4 is a TEM image of a polymer fiber in the fibrous filter.

The term "fibrous filter" as used herein refers to a filter that is made of polymer fibers, preferably interwoven polymer fibers. The diameter of each fiber ranges from about nm to about 2 μm, preferably from about 50 nm to about 1 μm, preferably from about 100 nm to about 500 nm. Accordingly, the fibrous filter is a porous polymer structure having pores with an average pore size in the range of 5 to 50 nm, preferably 10 to 45 nm, preferably to 40 nm. The silver nanoparticles that are deposited on the polymer fibers (as shown in FIG. 4) may have a size range of 1 to 100 nm, preferably 5 to 90 nm, preferably 10 to 80 nm. In one embodiment, the silver nanoparticles are configured to prevent formation of and/or kill microorganisms (e.g. bacteria) present within the fibrous filter or contaminated water, and thus the silver nanoparticles may provide an anti-biofouling property to the fibrous filter.

In one embodiment, the fibrous filter 110 further includes carbon nanotubes that are dispersed in the polymer fibers to provide mechanical stability to the fibrous filter. Accordingly, a weight percent of carbon nanotubes present in the fibrous filter is in the range of 0.5 to 5 wt %, preferably 1 to 4 wt %, preferably 1.5 to 3.5 wt %, preferably about 2 wt %, relative to the total weight of the fibrous filter.

In one embodiment, the term "mechanical stability" as used herein refers to an enhancement in flexural modulus by at least 20%, preferably at least 50%, more preferably at least 80%, even more preferably at least 100%, relative to a flexural modulus of a fibrous filter without having carbon nanotubes. For example, in one embodiment, a flexural modulus of the fibrous filter without having the carbon nanotube is in the range of 50 to 500 kPa, whereas a flexural modulus of the fibrous filter with the carbon nanotube is in the range of 100 kPa to 1 MPa. The term "mechanical stability" may also refer to an enhancement in fracture toughness, flexural strength, and tear strength.

Preferably, the carbon nanotubes are multi-walled carbon nanotubes (MWCNT) with a diameter in the range of 5-20 nm, preferably 8-15 nm, more preferably about 10 nm, and an aspect ratio of greater than or equal to about 5, preferably greater than or equal to about 100, more preferably greater than or equal to about 1000. The multi-walled carbon nanotubes may be closed structures having hemispherical caps at each end of respective tubes, or they may have a single open end or both open ends. Alternatively, the carbon nanotubes may be single-walled carbon nanotubes (SWCNT) with a diameter within the range of 0.5-3 nm, preferably 1-2 nm, more preferably about 1.5 nm, and an aspect ratio of greater than or equal to about 50, preferably greater than or equal to about 100, more preferably greater than or equal to about 1000. The single-walled carbon nanotubes may be closed structures having hemispherical caps at each end of respective tubes, or they may have a single open end or both open ends.

In one embodiment, the carbon nanotubes as used in this disclosure are produced from fly ash using chemical vapor deposition as reported by Salah et al. [U.S. Pat. No. 8,609, 189 B2; incorporated by reference in its entirety].

Alternative means to provide mechanical stability to the fibrous filter may also be adopted herein. For example, in one embodiment, a double layered mesh structure is utilized, wherein the fibrous filter is disposed between the two layers of the double layered mesh structure. Said mesh structure is configured to secure the fibrous filter in place within the filter housing and provide flexural strength to the fibrous filter, while allowing a water stream to pass through the fibrous filter. Said mesh structure may have a mesh size of less than 5 mm, preferably less than 2 mm. The term "mesh size" as used herein refers to the size of the holes (i.e. meshes) present in said mesh structure, as measured via ASTM E11:01.

In one embodiment, the water treatment system further includes an adsorbent layer 112 located within the filter housing 108, wherein the adsorbent layer comprises plasma activated carbon nanotubes to adsorb at least a portion of the organic pollutants present in water. The adsorbent layer 112 may preferably be located between the fibrous filter 110 and the inlet 114 of the filter housing 108, although the adsorbent layer 112 can also be located between the fibrous filter 110 and the outlet 116 of the filter housing 108.

In some embodiments, the adsorbent layer 112 is formed by plasma treatment of carbon nanotubes in an oxygen atmosphere. Accordingly, a ceramic crucible, which contains carbon nanotubes, is placed in a chamber of a microwave chemical vapor deposition system. The chamber is evacuated to a pressure of about $10^{-1}$ Pa, preferably about 104 Pa. The chamber is then purged with oxygen. Then, plasma activation starts after the chamber is filled with oxygen. Preferably, the plasma activation is continued for a period of about 5 to 120 minutes, preferably 20 to 50 minutes, preferably 25 to 35 minutes, more preferably about 30 minutes, under a power of about 300 to 600 Watt, preferably about 500 Watt. In one embodiment, a specific surface area of carbon nanotubes increased by at least 5%, preferably at least 10%, preferably at least 15%, preferably at least 20%, preferably at least 25%, preferably at least 30%, relative to the specific surface area of carbon nanotubes prior to the plasma treatment. In another embodiment, the carbon nanotubes are surface functionalized with one or more functional groups selected from C—O, C=O, and O—C=O.

The plasma activated carbon nanotubes may be in the form of a buckypaper. The term "buckypaper" as used herein refers to a film-shaped aggregate of plasma activated carbon nanotubes. Having the plasma activated carbon nanotubes in the form of a buckypaper may enhance an effective electroactive surface area through which organic pollutants are adsorbed. The adsorbent layer 112 may include one buckypaper layer or a plurality of buckypaper layers, wherein each buckypaper layer may have a thickness in the range of 10-1,000 μm, preferably 100-900 μm, more preferably 200-500 μm. The plasma activated carbon nanotubes may be substantially aligned or randomly oriented in the buckypaper.

Furthermore, the water treatment system may include a layer of sand, gravel, coarse silica, and/or ceramic particles to remove suspended solids and sediments. Said particles, i.e. sand, gravel, silica, or ceramic particles, may have a hydrophilic coating, e.g. an acrylic polymer such as poly (acrylic acid) or poly(acrylamide), poly(ethylene glycol), poly(ethylene oxide), poly(vinyl alcohol), poly(vinyl pyrrolidone). In one embodiment, said layer of sands, gravels, coarse silica, and/or ceramic particles are secured in a cotton pad or a fabric and located inside the filter housing preferably between the adsorbent layer 112 and the inlet 114. A second layer of sands, gravels, coarse silica, and/or ceramic particles may also be located in the filter housing and between the fibrous filter 110 and the outlet 116.

One aspect of the invention relates to a method of fabricating the fibrous filter 110. According to the method, a colloidal suspension of silver nanoparticles, polyvinylpyrrolidone (PVP), and dimethylformamide (DMF) is mixed with a ketone-based solvent to form a precursor suspension.

Exemplary ketone-based solvents include, but are not limited to acetone, acetophenone, butanone, cyclopentanone, 2-pentanone, 3-pentanone, isophorone, methyl isopropyl ketone, and ethyl isopropyl ketone. However, in a preferred embodiment, the ketone-based solvent is acetone, and the colloidal suspension is mixed with acetone at a volume ratio of 3:1 to 5:1, preferably 3.5:1 to 4.5:1, more preferably about 4:1.

The polyvinylpyrrolidone present in the colloidal suspension may have a weight average molecular mass of 10,000-400,000 dalton, preferably 50,000-350,000 dalton, preferably 100,000-300,000 dalton. Also, silver nanoparticles present in the colloidal suspension may be in the form of a powder, or in a form of a suspension. A concentration of polyvinylpyrrolidone in the colloidal suspension is preferably no more than 20 vol %, preferably no more than 25 vol %, relative to the total volume of the colloidal suspension. Also, an amount of silver nanoparticles in the colloidal suspension is preferably no more than 2 wt %, preferably no more than 5 wt %, relative to the total weight of the colloidal suspension.

The method of fabricating the fibrous filter further involves mixing polyvinylidene fluoride (PVDF) with the precursor suspension to form a first suspension. The polyvinylidene fluoride as used herein may have a weight average molecular mass of 75,000-700,000 dalton, preferably 100,000-650,000 dalton, preferably 200,000-600,000 dalton. Preferably, an amount of polyvinylidene fluoride in the first suspension is in the range of 10 to 20 wt %, preferably 12 to 18 wt %, preferably 15 to 17 wt %, preferably about 16 wt %, relative to the total weight of the first suspension. In a preferred embodiment, polyvinylidene fluoride is mixed with the precursor suspension at a temperature in the range of 80 to 100° C., preferably 85 to 95° C., preferably about 90° C.

Besides mixing the polyvinylidene fluoride with the precursor suspension, polymethylmethacrylate is separately mixed with the precursor suspension to form a second suspension. The polymethylmethacrylate as used herein may have a weight average molecular mass of 15,000-900,000 dalton, preferably 50,000-800,000 dalton, preferably 100,000-750,000 dalton. Preferably, an amount of polymethylmethacrylate in the second suspension is in the range of 10 to 20 wt %, preferably 12 to 18 wt %, preferably 15 to 17 wt %, preferably about 16 wt %, relative to the total weight of the second suspension. In a preferred embodiment, polymethylmethacrylate is mixed with the precursor suspension at a temperature in the range of 35 to 60° C., preferably 40 to 50° C., preferably about 45° C.

The method of fabricating the fibrous filter further involves mixing the first suspension with the second suspension at a temperature in the range of 35 to 60° C., preferably 40 to 50° C., preferably about 45° C., to form an electrospin suspension. Preferably, the first suspension is mixed with the second suspension at a volume ratio of 2:1 to 4:1, preferably 2.5:1 to 3.5:1, preferably about 3:1.

In a preferred embodiment, a carbon nanotube suspension that includes carbon nanotubes in dimethylformamide is mixed with the electrospin suspension. The carbon nanotube suspension may preferably have a carbon nanotube concentration in the range of 0.5 to 2 g/L, preferably 0.7 to 1.5 g/L, preferably about 1 g/L. The carbon nanotube suspension is preferably mixed with the electrospin suspension at a volume ratio of 1:6 to 1:10, preferably 1:7 to 1:9, preferably about 1:8. The electrospin suspension may be sonicated after mixing with the carbon nanotube suspension and before electrospinning. Accordingly, the electrospin is sonicated for at least 30 minutes, preferably at least 1 hour, but no more than 2 hours.

Figure 3:
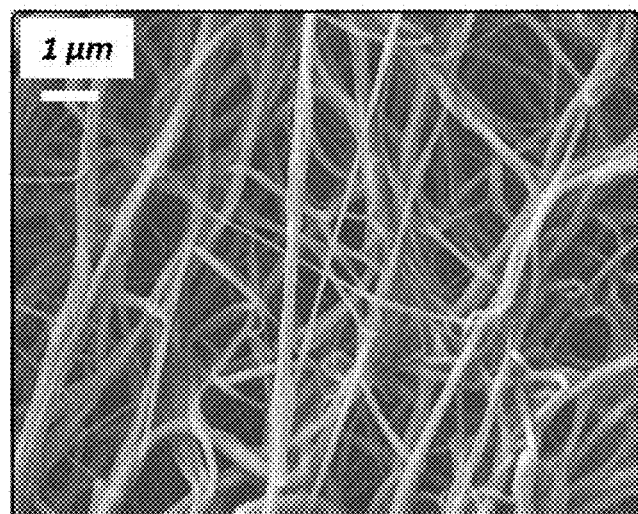
FIG. 3 is a SEM image of the fibrous filter.
Figure 5:
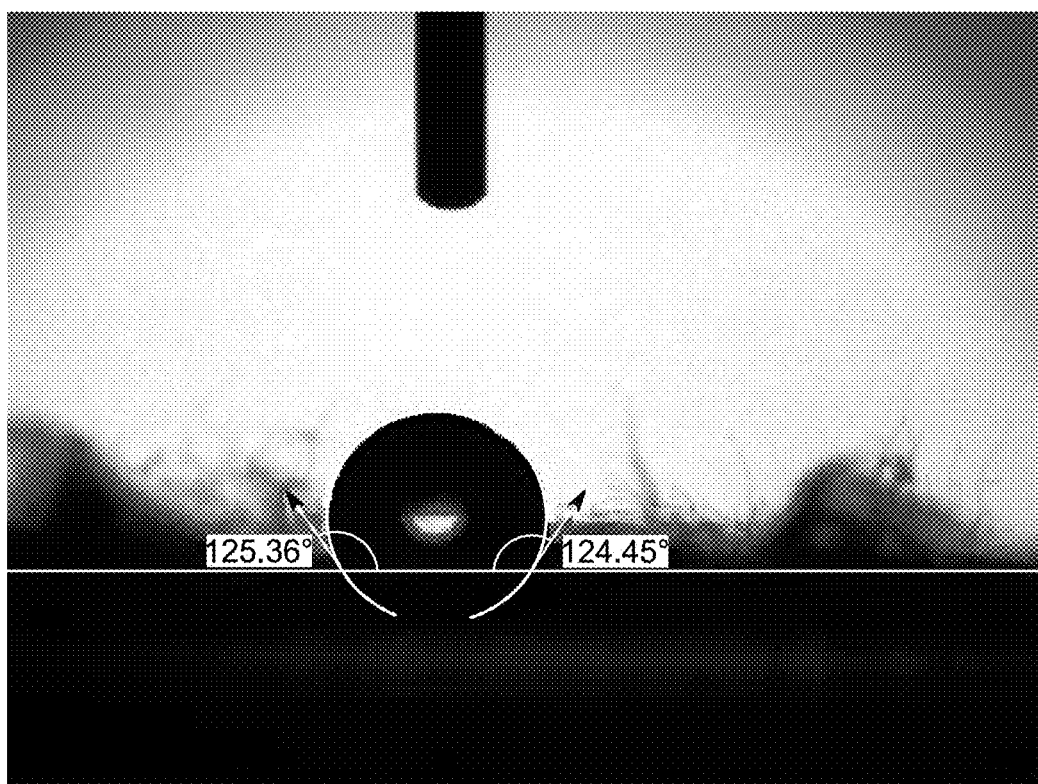
FIG. 5 is an optical image of a contact angle of a water droplet and the fibrous filter.

The electrospin suspension is further electrospun to form the fibrous filter that includes polymer fibers of polymethylmethacrylate, polyvinylidene fluoride, and polyvinylpyrrolidone, and further includes silver nanoparticles that are deposited on the polymer fibers, and optionally carbon nanotubes that are dispersed within the polymer fibers. The polymer fibers are shown in FIG. 3. The polymer fibers may be hydrophobic, wherein a water contact angle of the polymer fibers ranges from about 120 to about 130°, preferably from about 1240 to about 1260 (as shown in FIG. 5).

The electrospin suspension is electrospun with a syringe needle having an outside diameter in the range of 0.15 to 1.5 mm, preferably 0.2 to 1.25 mm; and an internal diameter in the range of 0.05 to 0.9 mm, preferably 0.08 to 0.85 mm. Electrospinning the electrospin suspension is conducted, wherein a flow rate of the electrospin suspension that comes out of the syringe needle is in the range of 0.1 to 5 mL/h, preferably 0.2 to 4.8 mL/h, preferably 0.3 to 4.5 mL/h, and wherein a voltage in the range of 10 to 32 kV, preferably 12 to 30 kV is applied.

According to a second aspect, the present disclosure relates to a method of forming purified water from a water stream, e.g. contaminated water, with the water treatment system.

The term "water" as used herein preferably refers to water having a total organic carbon content of at least 4 ppm, or at least 5 ppm, or at least 10 ppm, or at least 50 ppm, or at least 100 ppm, or at least 500 ppm, or at least 1000 ppm. Alternatively, the term "water" may refer to wastewater from various sources, ocean or sea water, river water, etc. In addition, the term "purified water" as used herein refers to water having a total organic carbon content of less than 10 ppm, preferably less than 5 ppm, preferably less than 4 ppm, preferably less than 3 ppm, preferably less than 2 ppm, preferably less than 1 ppm.

In one embodiment, the water treatment system consists of the pipe, the transparent section, and the photocatalytic nanocomposite sheet. Accordingly, the adsorbent layer and the fibrous filter are not present in this embodiment. In view of this embodiment water, i.e. contaminated water, is delivered to the water inlet 101 of the pipe from an upstream source, e.g. a wastewater tank 122, etc. Said contaminated water is passed through the transparent section of the pipe, wherein a portion of organic pollutants present in the contaminated water are decomposed, and relatively purified water is obtained from a collector 106 that is located downstream of the transparent section 102 and upstream of the filter housing 108, and fluidly connected to the pipe 104.

In one embodiment, passing water, i.e. contaminated water, through the photocatalytic nanocomposite sheet 105 reduces a total organic carbon content present in said contaminated water by about 20% to about 30%, preferably about 24% to about 28% of a total organic carbon content present in said contaminated water. For example, in one embodiment, passing contaminated water with a total organic carbon content of about 10 to 10,000 ppm, preferably 50 to 9,000 ppm, preferably 100 to 8,000 ppm, preferably 200 to 7,000 ppm, preferably 300 to 6,000 ppm, preferably 400 to 5,000 ppm, preferably 500 to 4,000 ppm, preferably 600 to 3,000 ppm, preferably 700 to 2,000 ppm, preferably 800 to 1,000 ppm, through the photocatalytic nanocomposite sheet, may form purified water having a total organic carbon content of about 8 to 8,000 ppm, preferably 40 to 7,000 ppm, preferably 80 to 7,000 ppm, preferably 150 to 6,000 ppm, preferably 250 to 5,000 ppm, preferably 300 to 4,000 ppm, preferably 400 to 3,000 ppm, preferably 450 to 2,500 ppm, preferably 550 to 1,800 ppm, preferably 600 to 800 ppm. In another embodiment, passing contaminated water with a total organic carbon content of about 1 to 50 ppm, preferably about 3 to 20 ppm, preferably about 4.5 to 5 ppm, preferably about 4.6 ppm, through the photocatalytic nanocomposite sheet, may form purified water having a total organic carbon content of about 0.8 to 45 ppm, preferably about 2.5 to 15 ppm, preferably about 3.3 to 3.5 ppm, preferably about 3.4 ppm.

The term "Total Organic Carbon (TOC)" as used herein refers to the amount of carbon found in water, e.g. contaminated water or purified water, and may be used as an indicator of water quality or cleanliness of the water sample.

In a preferred embodiment, the water treatment system further comprises the filter housing 108 that includes the adsorbent layer 112 and the fibrous filter 110, wherein the inlet 114 of the filter housing 108 is fluidly connected to the water outlet 107 of the pipe 104. Accordingly, the method of purifying involves passing the contaminated water through both the photocatalytic nanocomposite sheet, the adsorbent layer, and the fibrous filter to form purified water. In view of this embodiment, the contaminated water is first delivered to the water inlet 101 of the pipe from an upstream source, e.g. a wastewater tank 122, etc. Said contaminated water is first passed through the transparent section of the pipe, wherein a portion of organic pollutants present in the contaminated water is decomposed. Then, said contaminated water is passed through the adsorbent layer and the fibrous filter present inside the filter housing, wherein at least a portion of organic pollutants that may or may not have been decomposed in the photocatalytic nanocomposite sheet is adsorbed by the adsorbent layer and the fibrous filter. In addition, solid particles that are suspended in water and having an average particle size of more than 50 nm, preferably more than 40 nm, may also be filtered. Moreover, the contaminated water may be disinfected due to the presence of the silver nanoparticles, and thus microorganisms and bacteria may be removed. As a result, purified water is obtained from the outlet of the filter housing.

In one embodiment, passing contaminated water through the photocatalytic nanocomposite sheet, the adsorbent layer, and the fibrous filter causes a reduction of about 60% to about 75%, preferably about 65% to about 70% of a total organic carbon content present in the contaminated water. Accordingly, a ratio of a total organic carbon content of the contaminated water to a total organic carbon content of the purified water is in the range of 2:1 to 5:1, preferably 2.5:1 to 4:1, preferably about 3:1. For example, in one embodiment, passing contaminated water with a total organic carbon content of about 1 to 50 ppm, preferably about 3 to 20 ppm, preferably about 4.5 to 5 ppm, preferably about 4.6 ppm, through the photocatalytic nanocomposite sheet, the adsorbent layer, and the fibrous filter may form purified water having a total organic carbon content of about 0.3 to 20 ppm, preferably about 1 to 5 ppm, preferably about 1.2 to 1.6 ppm, preferably about 1.5 ppm.

The phrase "passing contaminated water through a filter" as used herein refers to a process whereby the contaminated water from an upstream source, e.g. a wastewater tank 122, etc. is brought into contact with the filter, and preferably a pressure is applied to force the contaminated water through the filter (i.e. the photocatalytic nanocomposite sheet, the adsorbent layer, and the fibrous filter). The pressure may be a positive pressure, which is provided by, for example, a positive displacement pump that is located upstream of and fluidly connected to the transparent section of the pipe (not shown). Alternatively, the pressure may be a negative pressure, which is provided by, for example, a vacuum pump 118 that is located downstream of and fluidly connected to the outlet 116 of the filter housing 108. Each of the positive or negative pressure may be in a range of 1 to 10 bars, preferably 2 to 8 bars, preferably about 4 bars.

By applying the pressure (i.e. the positive pressure and/or the negative pressure), water permeates through the photocatalytic nanocomposite sheet, the adsorbent layer, and the fibrous filter of the water treatment system, and purified water is collected via the outlet of the filter housing. In one embodiment, a valve is disposed on the outlet to control a flow rate of the purified water. A flow rate of the purified water depends on a water permeability of the photocatalytic nanocomposite sheet, the adsorbent layer, and the fibrous filter, and also the positive pressure and/or the negative pressure applied to water. Preferably, the water treatment system may produce purified water with a flow rate in the range of 0.5 to 100 L/min, preferably 1 to 50 L/min, more preferably 2 to 20 L/min.

In another preferred embodiment, at least a portion of purified water, which is received from the outlet of the filter housing, is recycled to the water inlet of the pipe, so the purified water is passed through the photocatalytic nanocomposite sheet, the adsorbent layer, and the fibrous filter. Accordingly, the total organic carbon content is reduced by at least 80%, preferably at least 90%, more preferably at least 95%, relative to the total organic carbon content that was initially present in the contaminated water.

The foregoing paragraphs have been provided by way of general introduction, and are not intended to limit the scope of the following claims. The described embodiments, together with further advantages, will be best understood by reference to the following detailed description taken in conjunction with the accompanying drawings.

The examples below are intended to further illustrate protocols for the water treatment system, and the method of fabricating the photocatalytic nanocomposite sheet and the fibrous filter, and are not intended to limit the scope of the claims.

Example 1—Synthesis of $Ag_3PO_4$/PMMA Nanocomposite Sheet

The materials used to fabricate to $Ag_3PO_4$/PMMA nanocomposite sheet are $Ag_3PO_4$ nanoparticles in powder form, polymethylmethacrylate (PMMA) (molecular weight can range from 15000-900000 dalton) and a chloroform solvent. The experiment was performed as follow; $Ag_3PO_4$ nanoparticles in the powder form were first mixed with PMMA in a chloroform solvent. In a typical case, 2 g of PMMA were added to 100 ml of chloroform and magnetically stirred at 50° C. until a colorless homogeneous solution was obtained. Afterwards, 100 mg of $Ag_3PO_4$ nanoparticles was added to PMMA solution and sonicated for 2 h then magnetically stirred for another 2 h to get a clear homogenous yellow solution. The prepared solution was casted in pre-cleaned glass petri dish, wherein the chloroform solvent was evaporated and the formed sheet of $Ag_3PO_4$/PMMA nanocomposite was collected. A photocatalytic experiment was conducted by placing the $Ag_3PO_4$/PMMA nanocomposite sheet under intensified/concentrated sunlight. Two mirrors were used to intensify the sunlight to the sheet.

Example 2—Synthesis of Nanofibers Made from PMMA/PVDF/Ag/CNTs

The materials used to fabricate nanofibers made from PMMA/PVDF/Ag/CNTs are polymethylmetacrylate (PMMA) (molecular weight ranges from 15000-900000 dalton), polyvinylidene fluoride (PVDF) (molecular weight ranges from 75000-700000 dalton), polyvinylpyrrolidone (PVP) (molecular weight ranges from 10000-400000 dalton), N,N-dimethylformamide (DMF), acetone, silver nitrate ($AgNO_3$), carbon nanotubes that were made from fly ash (CNTs).

To prepare nanofiber composites made from PMMA/PVDF/PVP/Ag/CNTs, an electrospin suspension is first made as follows. Solution A was a colloidal silver nanoparticles stabilized by PVP in DMF solvent. Solution B formed by mixing solution A with acetone. Solution C was made by mixing solution A with solution B at a ratio of 4:1 by volume. Solution D was prepared by dissolving PVDF in solution C, wherein a concentration of PVDF was 16% by weight. Solution D was heated up to 90° C. to completely dissolve the polymer and then the solution cooled. Solution E was prepared similar to solution D by dissolving PMMA in solution C, wherein a concentration of PMMA was 16% by weight. Solution E heated only up to 45° C. Solution F was made by mixing solution D with solution E at a ratio 3:1 by volume. To this solution CNTs was also added to increase the mechanical property of the nanofibers. It was added in the form of a solution of CNTs in DMF at a concentration of 1 mg/ml. The ratio of CNTs solution to solution F was 0.5:4 by volume. Then, solution F that contains CNTs was continuously stirred and simultaneously sonicated for 0.5 h. The solution F was further electrospun using an electrospinning system manufactured by NANON Company, Japan with a syringe needle of 18 to 36 gauge. The flow rate was set in the range of 0.3 to 4.5 mL/h, while the applied voltage was set to a value in the range of 12 to 30 KV. Formation of the nanofibers was confirmed by a scanning electron microscope. Different samples of waste water containing different organic pollutants were evaluated for the degradation of such pollutants using the above mentioned system.

Example 3—Plasma Activation of CNTs

Carbon nanotubes were activated by oxygen plasma using the microwave chemical vapor deposition system. In this experiment appropriate amount of CNTs was kept in a ceramic crucible and placed inside the chamber of the system. Then the chamber was evacuated. Oxygen gas was purged at a flow rate of 75 sccm. When the system was stabilized the plasma was generated at a power of 500 Watt. The plasma was continued for 30 min. Finally the system was switch down and the sample was collected and used in the water treatment system.

The carbon nanotubes (CNTs) used in this study was obtained from fly ash based on the methodology described by Salah et al. [Numan Salah, Forming Carbon Nanotubes from Carbon rich fly ash, U.S. Pat. No. 8,609,189 B2; Numan Salah, Sami S Habib, Zishan H Khan, Attieh A Al-ghamdi, Adnan Memic, Formation of carbon nanotubes from carbon rich fly ash: growth parameters and mechanism, Materials and Manufacturing Processes, 31, (2016) 146].

Example 4—Designing the Water Purification System

The designed system consists of two parts. The first part contains the photocatalyst sheets of $Ag_3PO_4$/PMMA nanocomposite. These sheets were inserted in a coil-shape cylindrical glass tube, and then a number of these cylinders were sequentially connected and placed on a table. The table containing these cylinders can be directly exposed to the sunlight for photocatalytic reaction and organic pollutant degradation. Sunlight intensity was also enhanced by placing a plurality of mirrors to reflect sunlight to the table.

The second part contains the filter made of PMMA/PVDF/Ag/CNT nanocomposites. This filter was used to stop the dust particles and adsorb the residue of organic pollutants. The filter also used to remove bacteria, viruses, or other microorganisms present in the pollutant water. This filter was connected to a vacuum pump to accelerate the water flow through the filter. Above the filter various amounts of plasma activated CNTs were also used to adsorb organic pollutants.

Example 5—Evaluating the Purification Process Using the System

The tubes containing the photocatalyst sheets were exposed to sunlight with an illuminance of 100,000 lux during fixed period of daylight. Direct and intensified/concentrated sunlight were reflected to the table containing the photocatalyst sheets. The pollutant water (i.e. with methylene blue at a concentration of 4 ppm) was flowed inside the glass tubes containing the sheets and after five minutes of exposure, a few drops of treated water were collected for analysis. Then, this treated water was passed to the second unit, which contains the plasma activated CNTs and the filter membrane. Purified water was collected by the help of a sucking system (e.g. a vacuum pump). Other organic pollutants were also evaluated for the degradation/adsorption using this system. Then the collected samples were studied by UV-Vis absorption spectra for the determination of pollutant degradation. The collected samples after the first and second stage were also subjected to a HPLC analyzer (HPLC, SPD-20A, Shimadzu Corporation, Japan). A total organic carbon, TOC analysis, (TOC-VCPH total carbon analyzer, Shimadzu Corporation, Japan) were also performed and the results are listed in Table 1. The results show the TOC values in ppm of a distilled water sample, a water sample contaminated with methylene blue, a water sample after treating said contaminated water with the photocatalyst sheets, and a water sample after treating said contaminated water with the plasma activated CNTs and the fibrous filter. The water sample after treating said contaminated water with the plasma activated CNTs and the fibrous filter has a TOC value of less than 1 ppm, considering an initial TOC of pure water.

Figure 6:
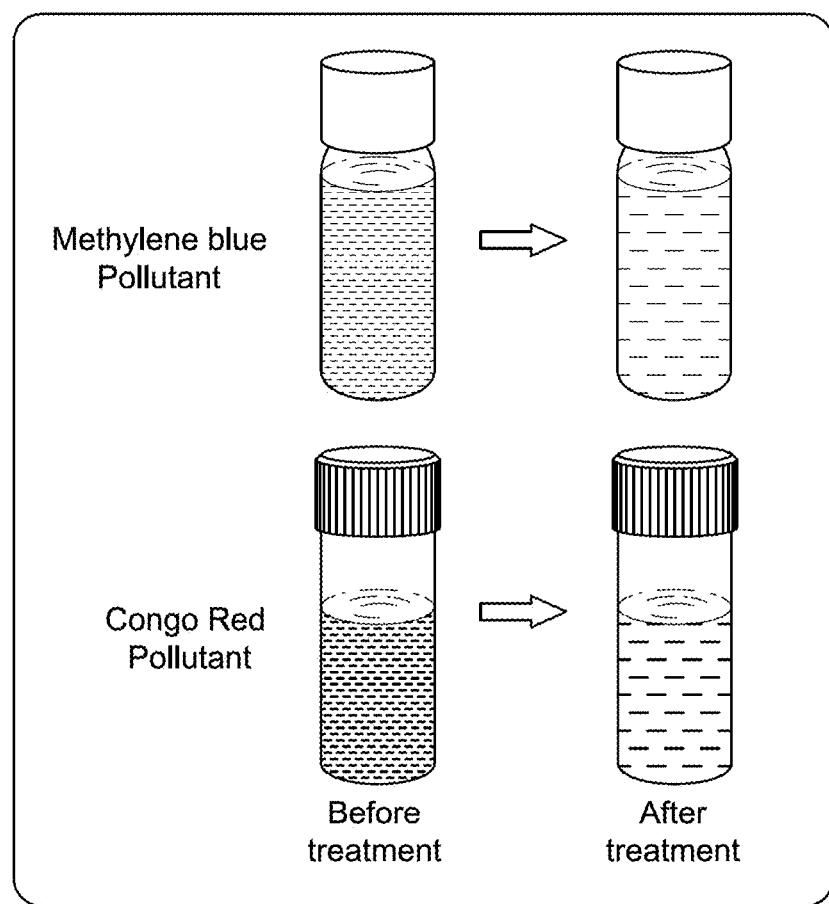
FIG. 6 shows contaminated water samples before and after treatment with the water treatment system.

Two contaminated water samples, one containing methylene blue as the contaminant and the other with Congo red as the contaminant, were prepared and treated with the water treatment system. FIG. 6 shows each of those samples before and after treatment using the water treatment system.

Figure 7:
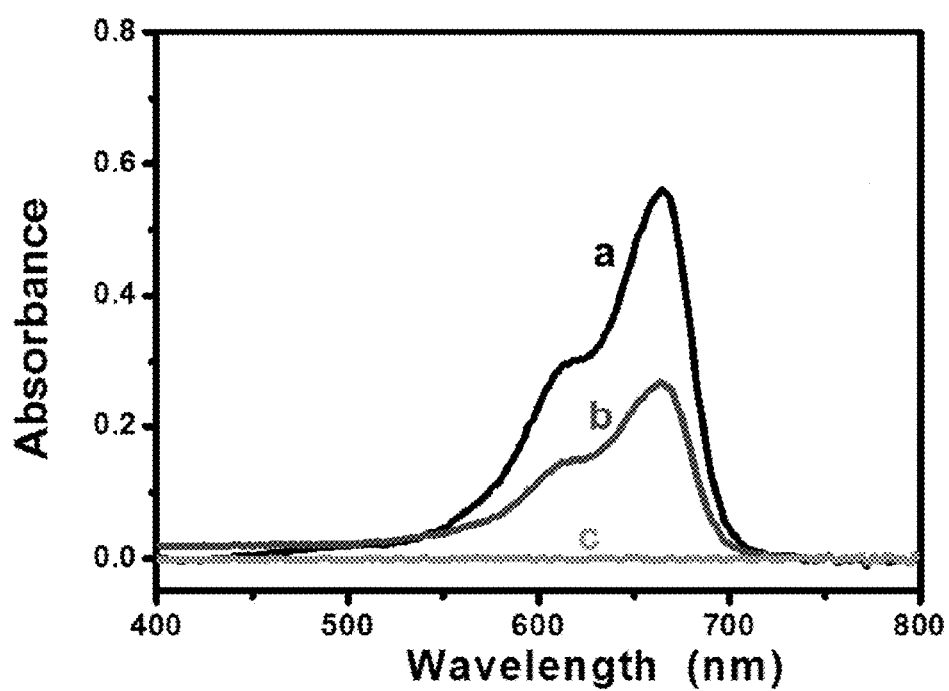
FIG. 7 represents UV/Vis absorption spectra of a contaminated water sample having methylene blue, a) before any treatment, b) after treatment with only the photocatalytic nanocomposite sheet, c) after treatment with the photocatalytic nanocomposite sheet, the adsorbent layer, and the fibrous filter.

FIG. 7 shows UV/Vis absorption spectra of contaminated water samples and the curves show the absorption peak of methylene blue a) before any treatment, b) after treatment with only the photocatalytic nanocomposite sheet, c) after treatment with the photocatalytic nanocomposite sheet and the fibrous filter. The peak that corresponds to the presence of methylene blue disappeared after treatment with the photocatalytic nanocomposite sheet and the fibrous filter indicating a complete degradation of methylene blue.

Figure 8:
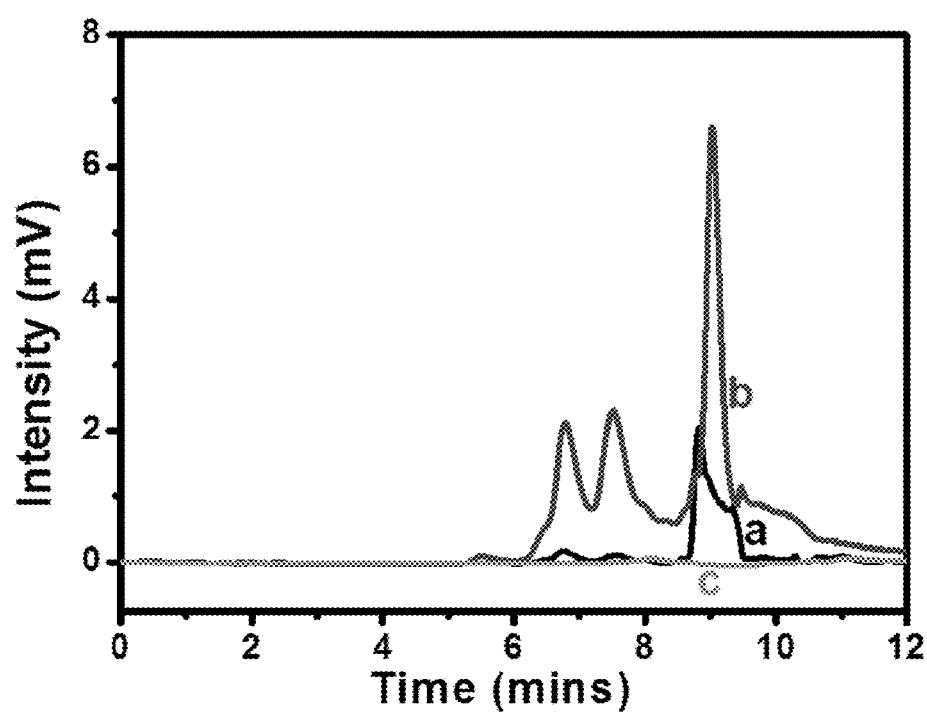
FIG. 8 represents HPLC profiles of a contaminated water sample having methylene blue, a) before any treatment, b) after treatment with only the photocatalytic nanocomposite sheet, c) after treatment with the photocatalytic nanocomposite sheet, the adsorbent layer, and the fibrous filter.

FIG. 8 shows HPLC profiles of contaminated water samples having methylene blue, a) before any treatment, b) after treatment with only the photocatalytic nanocomposite sheet, c) after treatment with the photocatalytic nanocomposite sheet and the fibrous filter. The peaks that correspond to the presence of methylene blue disappear, which indicates a complete degradation/removal of methylene blue after treatment.

TABLE 1

TOC removal (mineralization) of methylene blue using the new water purification system.

| Sample | TOC result (PPM) |
|---|---|
| Pure water | 0.81 |
| Un-treated waste water | 4.60 |
| Treated by photocatalyst | 3.42 |
| Final treated by adsorption and filter | 1.51 |

The invention claimed is:

1. A photocatalytically active water treatment system, comprising:
    a pipe comprising a water inlet, a water outlet, and a transparent section located between the water inlet and the water outlet; and
    a photocatalytic nanocomposite sheet comprising polymethylmethacrylate and silver phosphate located inside the transparent section, wherein the photocatalytic nanocomposite sheet is configured to decompose at least a portion of organic pollutants present in water, and
    wherein the transparent section comprises a plurality of U-shaped tubes coupled to one another, each U-shaped tube containing a rolled section of the photocatalytic nanocomposite sheet.

2. The water treatment system of claim 1, wherein the photocatalytic nanocomposite sheet has a thickness in the range of 0.5 to 2 mm.

3. The water treatment system of claim 1, further comprising:
    at least one mirror configured to reflect sunlight to the transparent section.

4. The water treatment system of claim 1, further comprising:
    a filter housing with an inlet and an outlet; and
    a fibrous filter located inside the filter housing and between the inlet and the outlet,
    wherein the inlet is fluidly connected to the water outlet.

5. The filtration system of claim 4, wherein the fibrous filter comprises polymer fibers comprising polymethylmethacrylate, polyvinylidene fluoride, and polyvinylpyrrolidone, and silver nanoparticles deposited on the polymer fibers.

6. The water treatment system of claim 5, wherein the fibrous filter has pores with an average pore size in the range of 5 to 50 nm.

7. The water treatment system of claim 5, wherein the fibrous filter further comprises carbon nanotubes that are dispersed in the polymer fibers.

8. The water treatment system of claim 4, further comprising:
    an adsorbent layer of plasma activated carbon nanotubes located in the filter housing between the fibrous filter and the inlet.

* * * * *